United States Patent [19]

Hertrick

[11] Patent Number: 5,046,756
[45] Date of Patent: Sep. 10, 1991

[54] WHEEL AXLE ADJUSTMENT ASSEMBLY

[76] Inventor: Bradley J. Hertrick, 31 Andrew Street, Rocklea, Queensland, 4106, Australia

[21] Appl. No.: 539,893

[22] Filed: Jun. 18, 1990

[30] Foreign Application Priority Data

Jun. 21, 1989 [AU] Australia .................. PJ4838

[51] Int. Cl.$^5$ .............................................. B60G 11/02
[52] U.S. Cl. ....................................... 280/718; 267/52
[58] Field of Search .................. 280/80.1, 718, 682; 267/52

[56] References Cited

U.S. PATENT DOCUMENTS

| | | | |
|---|---|---|---|
| 2,745,661 | 5/1956 | Van Raden | 267/52 |
| 3,144,246 | 8/1964 | Hamlet | 267/52 |
| 3,194,580 | 7/1965 | Hamlet | 280/718 |
| 3,645,555 | 2/1972 | Traylor | 267/52 |
| 3,674,249 | 7/1972 | McGee | 267/52 |
| 3,730,508 | 5/1973 | Marian et al. | 267/52 |

Primary Examiner—Kenneth R. Rice
Attorney, Agent, or Firm—Hoffman, Wasson & Gitler

[57] ABSTRACT

A wheel axle adjustment assembly is provided to allow a wheel axle to be adjusted at a plurality of positions. The assembly includes a pair of bearing plates which are advantageously provided with corrugations. The corrugations allow the bearing plate to be adjusted relative to each other along a number of positions while interlocking the bearing plates relative to each other upon bearing engagement. In an alternative embodiment, a threaded rod can be positioned between the bearing plates to allow the required adjustment. The assembly allows relatively quick and inexpensive alignment of axles or vehicles and particularly for vehicles having multiple axles.

14 Claims, 4 Drawing Sheets

WHEEL AXLE ADJUSTMENT ASSEMBLY

BACKGROUND

This invention relates to a wheel axle adjustment assembly suitable for use in vehicles that include a rigid or beam-type drive axle assembly supported by a compound leaf spring assembly. Commonly a bearing means is interposed between the axle assembly and the spring assembly to assist in mounting the axle assembly to the spring assembly.

The bearing means is usually positively located on the spring assembly by a suitable locating means, such as a cooperating spigot and socket. The positive locating means minimizes relative lateral and longitudinal movements between the axle assembly and the spring assembly.

This design works well when all the relevant components are manufactured to the close tolerances required. However, this degree of accuracy is not always achievable due to either design limitations, manufacturing limitations, or operational limitations. The end result of these limitations is that the operating performance of the relevant components is compromised.

In vehicle suspensions, for example, where at least one beam axle is located by a compound leaf spring or a semi-elliptic leaf spring, the axle(s) is designed to be located such that the longitudinal axis of the axle is perpendicular to the longitudinal axis of the vehicle's chassis. However, when manufacturing and assembling tolerances are included, an angular tolerance of $\pm 0.25°$ from perpendicular is permitted by most vehicle manufacturers. When dual rear axle suspensions are used, the pair of axles are ideally located parallel to each other, but again, a manufacturing tolerance is allowed, with a taper of $\pm 1.5$ mm/m being permitted. This taper results in the pair of drive wheels on one side of the vehicle being located closer together than the pair of drive wheels on the opposite side of the vehicle. These tolerances represent at best, a compromise between cost of manufacture and optimum vehicle performance.

Referring specifically to long-haul heavy vehicles, such as semi-trailer prime movers, a significant proportion of the operating cost is due to replacement of worn tires on the driving wheels. The best method of reducing this tire wear is to correctly align the drive axles. For vehicles driving on the left-hand side of the road, a suitable angular alignment of the drive axle is within the range from perpendicular to the longitudinal axis of the vehicle to 0.11° rotated to the left hand side of the vehicle. This enables the drive axle of the vehicle to effectively "steer" the vehicle up the camber of the road surface. For dual axle vehicles, the axles should be further aligned with respect to each other to within the range of parallel to a taper of 0.3 mm/m towards the right-hand side of the vehicle. This taper causes the pair of drive wheels on the driver's side of the vehicle to be closer together than the pair of drive wheels on the passenger's side of the vehicle.

The suitable or desired tolerances referred to above have additional benefits other than just decreased tire wear. In the power train, for example, the tighter tolerances lead to reduced stresses and distortions in the drive shafts and mountings, and hence increase component life and decrease maintenance cost. Also, the internal stresses in bearings, caused by misalignment of components are reduced, leading to further savings in maintenance costs.

To achieve the desired tolerances, it is sometimes necessary to relocate the mounting brackets for suspension components, or in extreme cases, it may be necessary to replace or remanufacture the offending components. Inevitably this type of rework is costly, time-consuming and more often than not fails to completely solve the problem. Instead, it can exacerbate existing problems, or create a new set of problems.

Alternatively, the desired tolerances can be achieved by relocating the bearing means which position the beam axle on the semi-elliptic leaf springs. This can be accomplished by repositioning the locating means used to locate the position of the bearing means. Where the locating means is a cooperating socket and spigot, the socket in either the spring pack or the rigid plate of the insulator would be repositioned. Again, this can be a time consuming and costly exercise.

In some instances, the vehicle manufacturers have recognized the alignment problem, and have manufactured bearing means with their locating means moved from their design position by a discrete distance to cope with a degree of misalignment. These modified bearing means reduce the costs of alignment, but are only applicable for a narrow range of misalignments. If the degree of misalignment is outside the scope of the modified bearing means then the problem is merely reduced by using them, but desired tolerances cannot be achieved without performing some sort of structural modification to either the vehicle or the axle assembly.

SUMMARY OF THE INVENTION

It is an object of the present invention to provide a wheel axle adjustment assembly which will allow a wheel axle of a vehicle to be adjusted relative to the vehicle to achieve a desired axle alignment, and so, alleviate some of the abovementioned alignment problems.

In one form the invention resides in a wheel axle adjustment assembly comprising a pair of bearing members bearingly interengageable with each other, one of said bearing members being securable against axial movement relative to a vehicle suspension assembly, the other of said bearing members being securable against axial movement relative to a wheel axle, each said bearing member including a bearing surface configured to allow the bearing members to be interlocked against movement relative to each other when bearingly interengaged at a plurality of positions.

It is preferred that the pair of bearing members comprise a pair of opposed plates. The relative position of these opposed plates with respect to each other may be manually adjusted, or alternatively, remotely adjusted.

Preferably the bearing surface of each of the opposed plates that is manually adjusted is at least partially defined by complementary corrugations oriented transversely to the direction of relative movement. Advantageously, the corrugations have a generally rectangular cross-section. Alternatively, the corrugations may be triangular in cross-section, sinusoidal in cross-section, or any other suitable cross-sectional shape. These corrugations allow the plates to be moved in discrete increments with respect to each other in a direction transverse to the orientation of the corrugations, and hence, a greater range of adjustment is available than that given by a modified insulator as previously described. Also, the corrugations fix the relative positions of the opposed pair of plates until the position of the plates is readjusted.

It is preferred that a means for coupling the opposed plates together is also provided. This coupling means may allow for manual adjustment and comprise one or more removable fasteners passing through slots in the movable plate. Desirably the fasteners comprise socket-head capscrews, with the socket heads being recessed into the outer surface of the movable plate.

Alternatively, the coupling means may allow for remote adjustment of the pair of opposed plates. In this instance, the coupling means may comprise a threaded bar positioned between the bearing faces to cause relative movement, or a hydraulic or pneumatic cylinder. For remote adjustment, the bearing surfaces of the opposed plates would preferably be smooth, and not corrugated.

Preferably a resilient bearing formed from a rubber or rubber-like material is moulded or cast directly onto one of the opposed plates. Alternatively, the resilient bearing may be attached to one of the opposed plates by a suitable adhesive prior to installation into the vehicle suspension assembly.

Additionally, one of the pair of bearing members may be modified to include a suitable locating means. Preferably, the locating means comprises a spigot which co-operates with a socket formed in the surface onto which the adjustment assembly is mounted. Alternatively, the locating means comprises a socket which locates on a spigot formed on the surface onto which the adjustment assembly is attached.

BRIEF DESCRIPTION OF DRAWINGS

The preferred embodiments of the invention will now be described with reference to the accompanying drawings, wherein.

DETAILED DESCRIPTION

Figure 1:
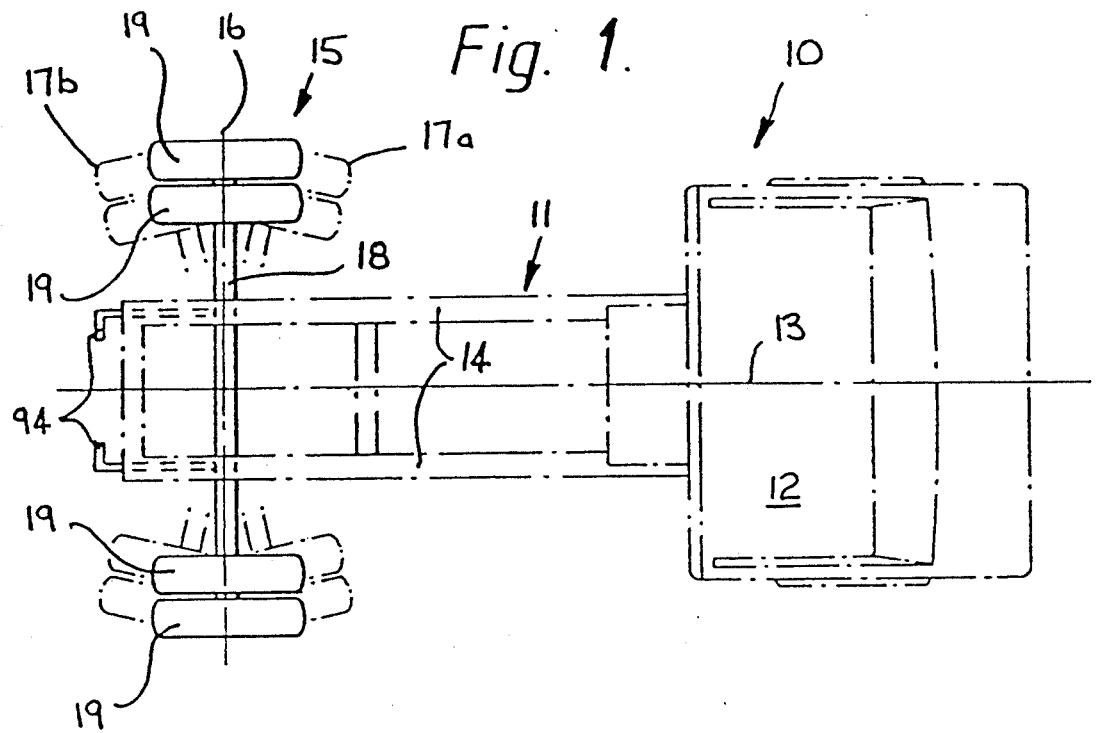
FIG. 1 is a plan view of a truck with single rear axle assembly.
Figure 2:
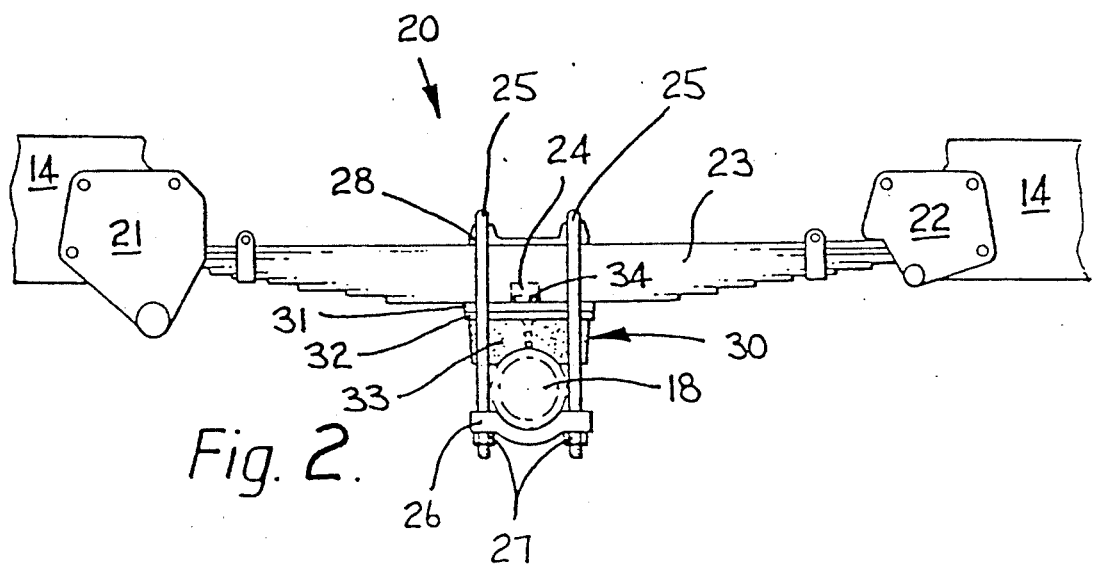
FIG. 2 is an elevation of the rear axle suspension of the truck of FIG. 1.

Referring firstly to FIGS. 1 and 2 there is shown a truck 10 having a chassis frame 11, operator's cabin 12 and rear axle assembly 15. The longitudinal axis 16 of axle assembly 15 is located perpendicular to the longitudinal axis 13 of truck 10. Axle assembly 15, which includes axle housing 18 and drive wheels 19, is attached to each chassis rail 14 of chassis frame 11 by a suspension assembly 20 (shown in detail in FIG. 2).

The angular position of axis 16 with respect to axis 13 is adjustable so that wheels 19 may be located somewhere between positions 17a and 17b. The degree of angular displacement has been exaggerated in FIG. 1 for clarity purposes, and in use would not exceed ±0.5° from perpendicular. Preferably, the actual displacement would be considerably less than this.

As shown in detail in FIG. 2, spring 23 of suspension 20 is attached to chassis rail 14 by mounting brackets 21 and 22. Axle housing 18 is positioned on spring 23 by spigot 34 of adjustment assembly 30 locating in a cooperating socket 24 of spring 23. Furthermore, axle housing 18 is clamped in place on spring 23 by U-bolts 25, clamp 26, nuts 27 and packer 28.

Adjustment assemblies 30 each comprise a pair of opposed plates 31 and 32 in bearing engagement with each other and mounted against spring 23, and a resilient bearing means or rubber block 33 which is used to isolate axle housing 18 from shocks generated in spring 23. Plates 31 and 32 are movable with respect to each other so that the angular position of axis 16 is adjustable with respect to the longitudinal axis 13 of truck 10.

A spigot 34 is formed on upper plate 31 and is substantially cylindrical in configuration. Spigot 34 is off centered by 4 mm to provide improved adjustability.

Figure 3:
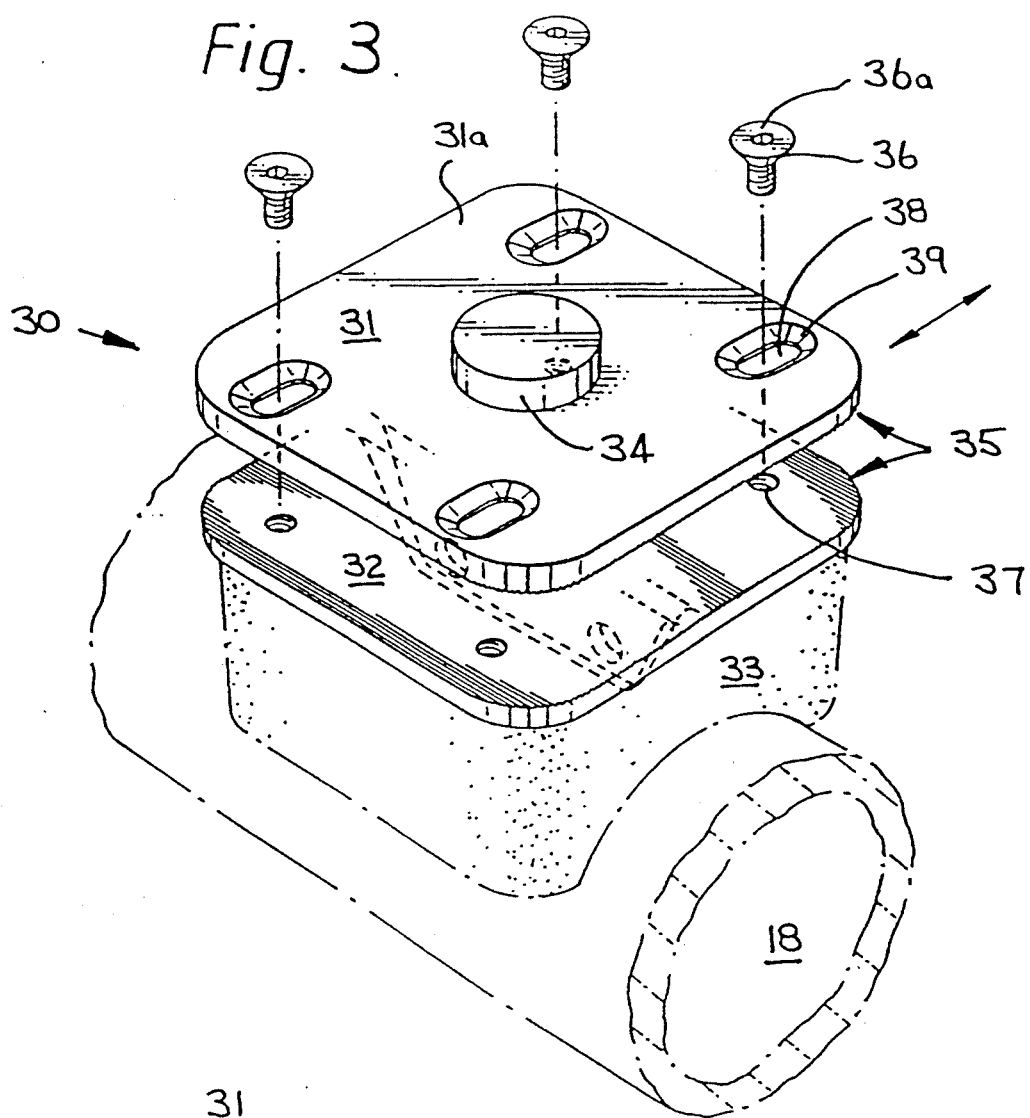
FIG. 3 is an enlarged perspective view of a first embodiment of an adjustment assembly according to the invention as used in the suspension of FIG. 2.
Figure 4:
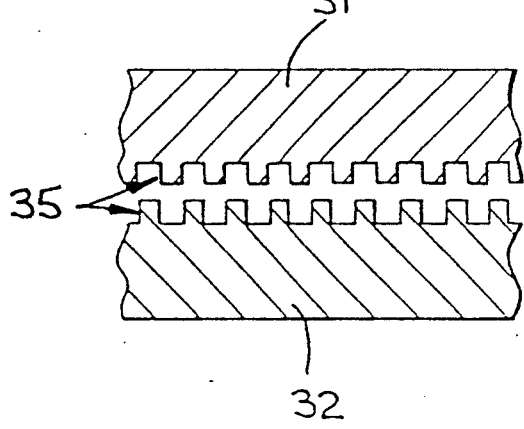
FIGS. 4 and 5 are details of alternative forms of corrugations applicable to the adjustment assembly of FIG. 3.
Figure 5:
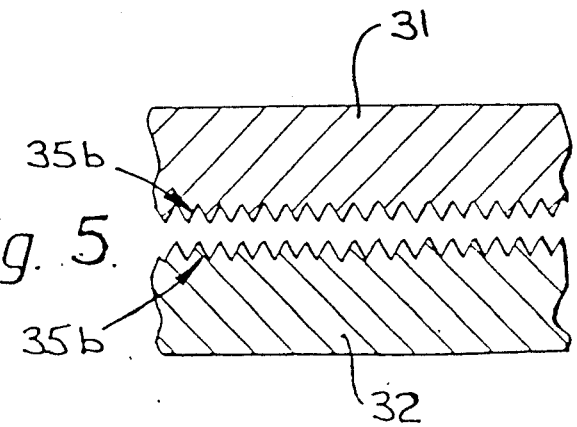

Referring to FIG. 3, it can be seen that plate 31 is movable with respect to plate 32 in the direction of arrow (i.e. transverse to the longitudinal axis of axle housing 18). Each of plates 31 and 32 are provided with a multiplicity of corrugations 35 transverse to the direction of adjustment. The corrugations 35 of plate 31 interact with the corrugations 35 of plate 32 so that plate 31 can be moved in discrete increments with respect to plate 32. This is better illustrated in FIG. 4 where the corrugations are substantially square in cross-section. Corrugations 35 are located at a pitch spacing of 1.0 mm to 1.5 mm and preferably 1.0 mm. Alternatively, the corrugations could be triangular in cross-section as shown in 35b in FIG. 5.

Opposed plates 31 and 32 are coupled together by removable fasteners or socket-head capscrews 36 which pass through slots 38 in plate 31 and screw into tapped holes 37 provided in plate 32. Each slot 38 is relieved at 39 to conform with the head shape of capscrew 36, so the flat surface 36a of capscrew 36 lies flush with the top surface 31a of plate 31 when capscrew 36 is installed.

To obtain the optimum angular alignment of the axle assembly 15 with respect to longitudinal axis 13 of truck 10, it is first necessary to measure the actual angle the axle assembly is installed at. This actual angle is then compared with the optimum angle to obtain the angular misalignment which has to be corrected. The angular misalignment of axle 18 is then converted to a linear distance along the length of spring 23 by using a suitable geometric formula.

Next, the weight of truck 10 is taken off springs 23 by lifting chassis frame 11. Nuts 27 on U bolts 25 are then loosened sufficiently so that capscrews 36 can be undone several turns. This enables plate 31 to be disengaged from plate 32, and plate 31 is then displaced a suitable number of increments to give the desired linear distance to correct the angular misalignment. Capscrews 36 are then retightened and spigot 34 is relocated in socket 24 in spring 23. Nuts 27 are retightened and the truck's weight is then transferred back to springs 23. Axle housing 18 should now be aligned within the range of perpendicular to axis 13, to 0.11° rotated to the left-hand side of the vehicle, as previously described.

Figure 6:
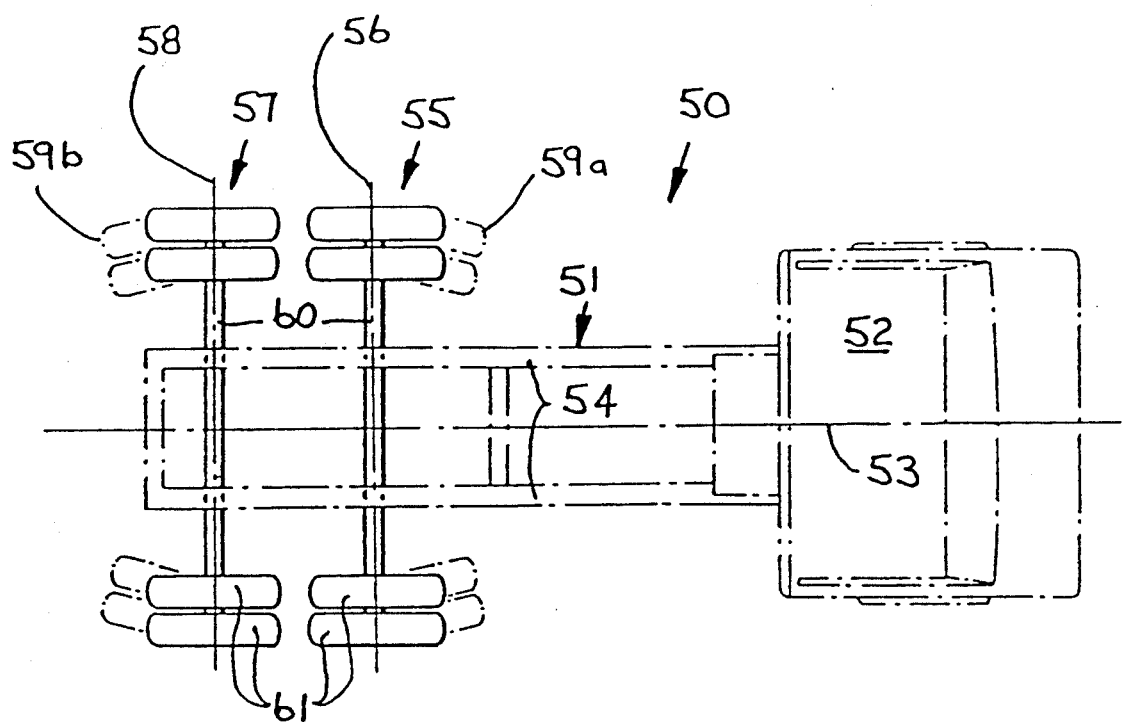
FIG. 6 is a plan view of a truck with dual rear axles.
Figure 7:
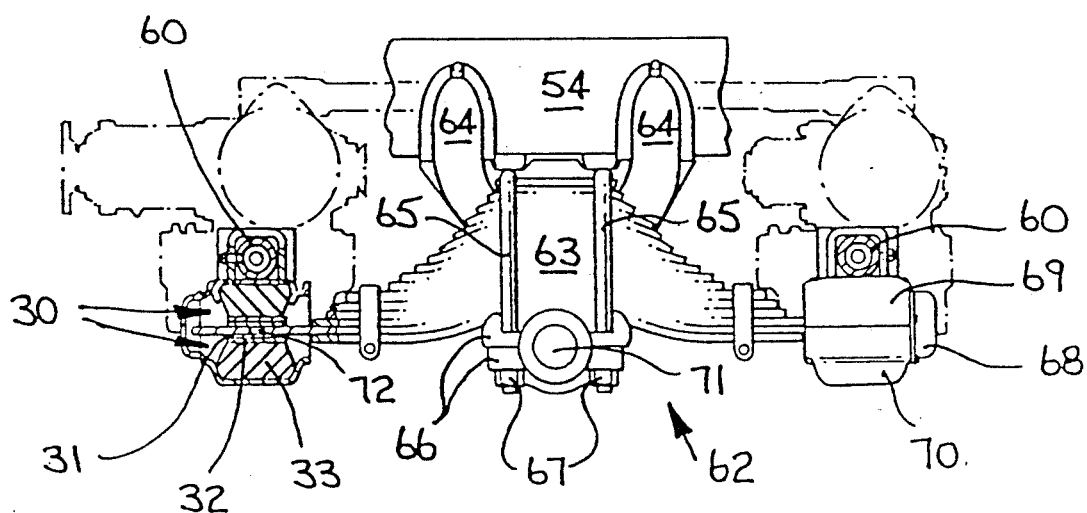
FIG. 7 is an elevation of the suspension of the truck of FIG. 6.

Referring to FIGS. 6 and 7, there is shown a truck 50 which has a chassis frame 51, operator's cabin 52 and dual rear axle assemblies 55 and 57. The longitudinal axis 56 and 58 of axle assemblies 55 and 57 respectively are located parallel to each other and perpendicular to the longitudinal axis 53 of truck 50. Axle assemblies 55 and 57 each include axle housing 60 and drive wheels 61, and are attached to each chassis rail 54 of chassis frame 51 by suspension assembly 62 (shown in detail in FIG. 7).

Suspension assembly 62 is attached to chassis rail 51 by brackets 64 and trunnion 71. Spring 63 is centrally mounted on trunnion 71 by U bolts 65, trunnion housing 66 and nuts 67. An axle housing 60 is located at each end of spring 63 by a pair of adjustment assemblies 30 similar to those described previously with reference to FIGS 1 to 5. Each assembly 30 locates with spigot 34 in hole 72 in spring 63 and is held in place by cap 68 and covers 69 and 70.

To align axle housings 60 with each other and with the longitudinal axis 53 of truck 50, it is first necessary to determine the angular position of each axis 56 and 58 with respect to axis 53. Any angular misalignment can be converted to a linear distance along spring 63 in a manner similar to that previously described.

Next chassis frame 51 is raised until the weight is off springs 63. Then cap 68 and cover 70 are removed and the lower shock insulator 30 is removed. Axle housing 60 is then raised until the upper assembly 30 can be removed. Plate 31 is then displaced the desired linear distance with respect to plate 32 in the manner described previously and the upper assembly 30 is then reinstalled between axle housing 60 and spring 63, with spigot 34 in hole 72. The lower assembly 30 is similarly adjusted and reinstalled and cover 70 and cap 68 refitted. Chassis frame 51 is then lowered until springs 63 take the weight. Axle housings 60 should then be aligned at the optimum settings discussed previously.

Figure 8:
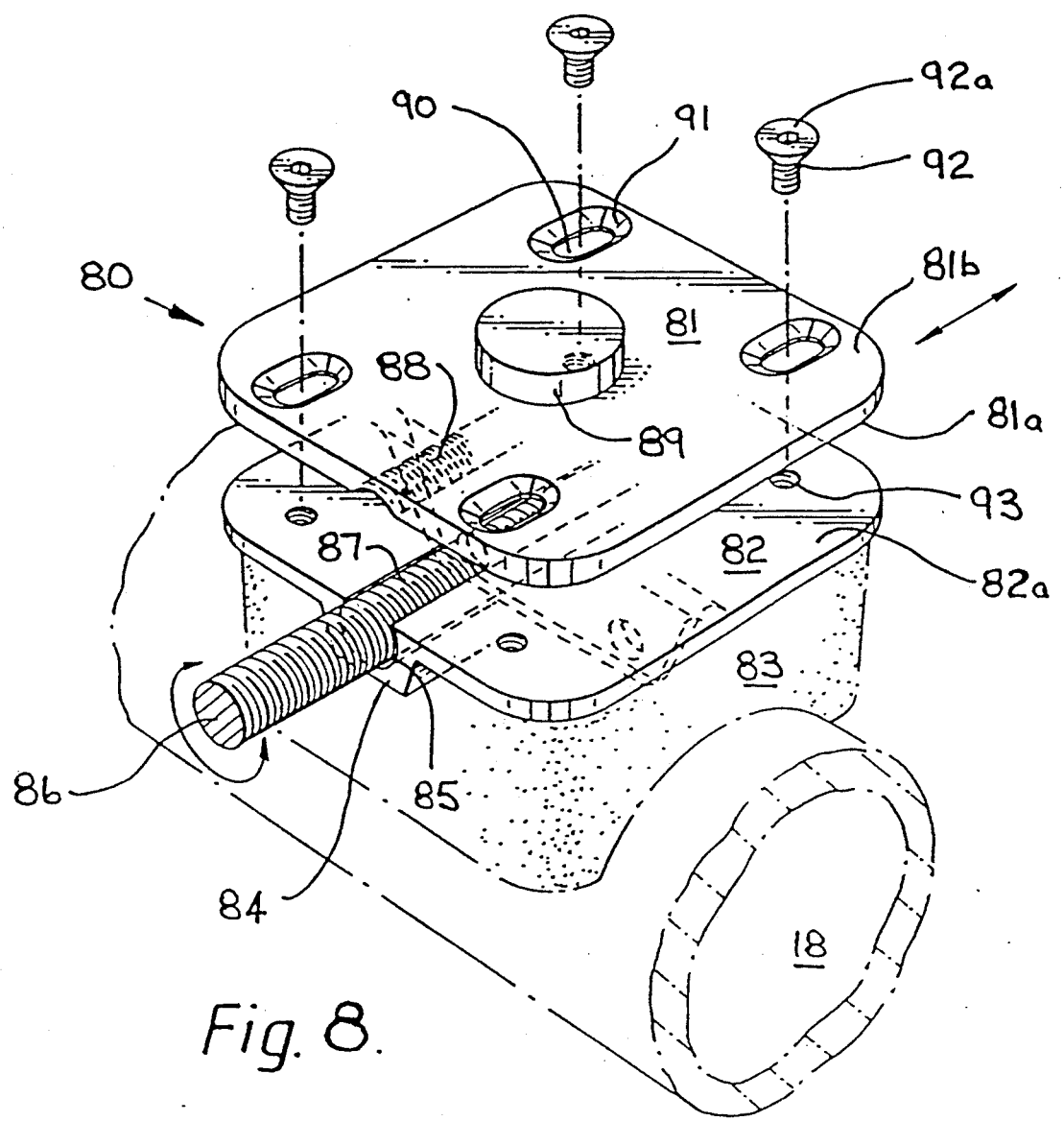
FIG. 8 is an enlarged perspective view of a second embodiment of an adjustment assembly according to the invention.

Each of the abovementioned adjustment assemblies is adjustable only in discrete increments due to the presence of corrugations. It is possible to provide an assembly with an infinite range of adjustment within the adjustable limits of the opposed plates. An adjustment assembly of this type is shown in FIG. 8.

In this FIGURE, adjustment assembly 80 comprises a pair of opposed plates 81 and 82 and resilient bearing means or rubber block 83. The engagement faces 81a and 82a of opposed plates 81 and 82 respectively are smooth to allow for sliding motion between the opposed plates. The lower plate 82, to which block 83 is attached, includes a boss 84 which is provided with a recess 85 to rotatably mount a threaded bar 86. Bar 86 is mounted such that a portion 87 of bar 86 projects above the level of surface 82a.

Upper plate 81 includes a threaded groove 88 in its engagement surface 81a which engages the projecting portion 87 of threaded bar 86. When bar 86 is rotated, plate 81 is caused to move in a direction parallel to the longitudinal axis of bar 86. Hence, rotating movement in bar 86 causes linear movement in plate 81, with the direction of linear movement of plate 81 dependent on the direction of rotation of the bar 86.

Coupling means in the form of socket head capscrews 92 are provided which pass through slots 90 in plate 81 and screw into threaded holes 93 in plate 82. Each slot 90 is adapted at 90 to conform to the shape of the head of capscrew 92 such that the upper surface 92a of capscrew 92 is located substantially level with the top surface 81b of plate 81 when capscrew 92 in installed. Capscrews 92 do not clamp plates 81 and 82 together, but merely restrain plate 81 to be threadedly engaged with bar 86 and capable of the sliding motion previously discussed.

In use, adjustment assembly 80 may replace the assembly 30 described previously and can be installed in the truck of FIGS. 1-3. This assembly would allow remote adjustment of the position of axle housing 18. To align the axle housing 18, it would be merely necessary to raise chassis frame 11 to take the weight off the spring 23, and to loosen nuts 27 so that packer 28 can slide on spring 23. Then threaded bar 86 is rotated by turning crank 94 depicted in FIG. 1, so that housing 18 is displaced the required distance to give alignment. Nuts 27 can then be tightened and chassis frame 11 lowered.

Similar comments would apply if adjustment assembly 80 was used in the truck of FIGS. 6 and 7, with the lower adjustment assembly not requiring removal from the suspension 62 as was previously required, thus further reducing costs and time used in adjustment.

The foregoing describes only two embodiments of the invention, and modifications obvious to those skilled in the art may be made without departing from the scope of the invention. The locating means on the adjustment assembly for example, may be a socket, rather than a spigot. Also, the corrugations may only extend partially across the engagement surfaces, and not completely across as described above.

I claim:

1. A suspension system for a vehicle including
   a) a chassis having a longitudinal axis,
   b) at least one wheel axle extending transversely to the longitudinal axis of said chassis,
   c) leaf spring assemblies extending longitudinally along opposite sides of said chassis for supporting said wheel axle,
   d) an adjustment assembly for moving said wheel axle along said leaf spring assemblies,
   e) said adjustment assembly comprising a pair of opposed bearing plates bearingly interengageable with each other,
   f) locating means defined on one of said bearing plates to locate said plate against axial movement relative to said suspension system.
   g) resilient bearing means securing the other of said bearing plates against axial movement relative to said wheel axle, and
   h) each one of said bearing plates including a bearing surface configured to allow the bearing plates to be interlocked against movement relative to each other when bearingly interengaged at a plurality of positions.

2. The wheel axle adjustment assembly as claimed in claim 1, wherein said bearing surface on each bearing member comprises corrugations.

3. The wheel axle adjustment assembly as claimed in claim 1, wherein said corrugations are substantially rectangular in cross-section.

4. The wheel axle adjustment assembly as claimed in claim 1, wherein said corrugations are substantially triangular in cross-section.

5. The wheel axle adjustment assembly as claimed in claim 1, wherein said corrugations extend substantially across the entire bearing surfaces.

6. The wheel axle adjustment assembly as claimed in claim 1, wherein said bearing members are bearingly interengaged by releasable fasteners.

7. The wheel axle adjustment assembly as claimed in claim 6, wherein said releasable fasteners include threaded fasteners passing through openings in one of said bearing members and threadingly interengageable with openings in the other of said bearing members.

8. The wheel axle adjustment assembly as claimed in claim 7, wherein the openings in said one of said bearing members comprise elongate slots to allow movement of said bearing members relative to each other upon loosening of said releasable fasteners.

9. The wheel axle adjustment assembly as claimed in claim 1, including a rotatable member located between said bearing members to move said bearing members relative to each other along a plurality of positions and to prevent relative movement of said bearing members upon bearing interengagement of said members.

10. The wheel axle adjustment assembly as claimed in claim 9, wherein said rotatable member comprises a threaded bar located partially within a corresponding groove of one of said bearing members and threadingly interengageable with a corresponding threaded groove on the other of said bearing members upon bearing interengagement of said members.

11. The wheel axle adjustment assembly as claimed in claim 10, wherein said bearing members are bearingly interengaged by releasable fasteners.

12. The wheel axle adjustment assembly as claimed in claim 11, wherein said releasable fasteners include threaded fasteners passing through openings in one of said bearing members and threadingly interengageable with openings in the other of said bearing members.

13. The wheel axle adjustment assembly as claimed in claim 12, wherein the openings in said one of said bearing members comprise elongate slots to allow movement of said bearing members relative to each other upon loosening of said fasteners.

14. The suspension system as defined in claim 1 wherein a socket is defined in said chassis, and said locating means comprises a spigot locatable within said socket.

* * * * *